(12) United States Patent
Ham et al.

(10) Patent No.: US 10,186,712 B2
(45) Date of Patent: Jan. 22, 2019

(54) CATALYST FOR OXYGEN REDUCTION REACTION COMPRISING IRIDIUM-BASED ALLOY

(71) Applicant: KOREA INSTITUTE OF SCIENCE AND TECHNOLOGY, Seoul (KR)

(72) Inventors: Hyung Chul Ham, Seoul (KR); Jinwon Cho, Seoul (KR); Hyun Seo Park, Seoul (KR); Jong Hyun Jang, Seoul (KR); Sung Jong Yoo, Seoul (KR); Chang Won Yoon, Seoul (KR); Hyoung-Juhn Kim, Seoul (KR); Sung Pil Yoon, Seoul (KR); Jonghee Han, Seoul (KR); Suk Woo Nam, Seoul (KR)

(73) Assignee: KOREA INSTITUE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 15/790,051

(22) Filed: Oct. 23, 2017

(65) Prior Publication Data

US 2018/0123139 A1 May 3, 2018

(30) Foreign Application Priority Data

Oct. 27, 2016 (KR) .......................... 10-2016-0140936

(51) Int. Cl.
*H01M 4/92* (2006.01)
*H01M 12/06* (2006.01)
(Continued)

(52) U.S. Cl.
CPC ........... *H01M 4/921* (2013.01); *H01M 12/06* (2013.01); *B01J 23/624* (2013.01);
(Continued)

(58) Field of Classification Search
CPC combination set(s) only.
See application file for complete search history.

(56) References Cited

U.S. PATENT DOCUMENTS

| 4,615,736 A | * | 10/1986 | Armor | ................. B22F 1/0007 |
| | | | | 148/513 |
| 2008/0217622 A1 | * | 9/2008 | Goyal | ................ H01L 21/0237 |
| | | | | 257/64 |

(Continued)

FOREIGN PATENT DOCUMENTS

| JP | 2007059140 A | 3/2007 |
| KR | 1020070100846 A | 10/2007 |

(Continued)

OTHER PUBLICATIONS

Ermete Antolini, "Iridium As Catalyst and Cocatalyst for Oxygen Evolution/Reduction in Acidic Polymer Electrolyte Membrane Electrolyzers and Fuel Cells", ACS Catalysis, Mar. 19, 2014, pp. 1426-1440, vol. 4, American Chemical Society.

(Continued)

*Primary Examiner* — Kaity V Chandler
(74) *Attorney, Agent, or Firm* — Cantor Colburn LLP (57) ABSTRACT

Provided is a catalyst for an oxygen reduction reaction, including an alloy in which two metals are mixed, in which the corresponding alloy is an alloy of iridium (Ir); and silicon (Si), phosphorus (P), germanium (Ge), or arsenic (As). The corresponding catalyst for the oxygen reduction reaction may have excellent price competitiveness while exhibiting a catalytic activity which is equal to or similar to that of an existing Pt catalyst. Accordingly, when the catalyst is used, the amount of platinum catalyst having low price competitiveness may be reduced, so that a production unit cost of a system to which the corresponding catalyst is applied may be lowered.

7 Claims, 10 Drawing Sheets

(51) Int. Cl.
*C22C 38/04* (2006.01)
*B01J 25/00* (2006.01)
*B01J 23/62* (2006.01)
*B01J 23/644* (2006.01)
*C22C 5/04* (2006.01)
*H01M 4/86* (2006.01)
*H01M 8/1018* (2016.01)

(52) U.S. Cl.
CPC ............ *B01J 23/6442* (2013.01); *C22C 5/04* (2013.01); *H01M 2004/8689* (2013.01); *H01M 2008/1095* (2013.01)

(56) References Cited

U.S. PATENT DOCUMENTS

| | | | | |
|---|---|---|---|---|
| 2011/0062446 | A1* | 3/2011 | Goyal | H01L 21/02381 257/64 |
| 2014/0348203 | A1* | 11/2014 | Murdoch | C22C 5/02 374/45 |
| 2016/0293967 | A1 | 10/2016 | Min et al. | |

FOREIGN PATENT DOCUMENTS

| | | |
|---|---|---|
| KR | 1020160118817 A | 10/2016 |
| WO | 2006086457 A2 | 8/2006 |

OTHER PUBLICATIONS

J. Uribe-Godinez et al., "Development of Ir-based and Rh-based catalyst electrodes for PEM fuel cell applications", International Journal of Hydrogen Energy, Nov. 16, 2012, pp. 7680-7683, vol. 38, Elsevier Ltd.

Xiaofang Yang et al., "Role of Surface Iron in Enhanced Activity for the Oxygen Reduction Reaction on a Pd3Fe (111) Single-Crystal Alloy", Angewandte Chemie International Edition, 2011, pp. 10182-10185, vol. 50, Wiley-VCH Verlag GmbH & Co.

Yunqing Liu et al., "Nanoporous PdTi Alloys as Non-Platinum Oxygen-Reduction Reaction Electrocatalysts with Enhanced Activity and Durability", ChemSusChem, 2013, pp. 78-84, vol. 6, Wiley-VCH Verlag GmbH& Co.

* cited by examiner

CATALYST FOR OXYGEN REDUCTION REACTION COMPRISING IRIDIUM-BASED ALLOY

CROSS-REFERENCE TO RELATED APPLICATION

This application claims the priority of Korean Patent Application No. 10-2016-0140936, filed on Oct. 27, 2016, and all the benefits accruing therefrom under 35 U.S.C. § 119, the contents of which in its entirety are herein incorporated by reference.

BACKGROUND

1. Field

The present disclosure relates to a new catalyst for an oxygen reduction reaction. More particularly, the present disclosure relates to a catalyst for an oxygen reduction reaction, including an iridium (Ir)-based alloy as a catalyst for an oxygen reduction reaction at an air electrode of a polymer electrolyte membrane fuel cell (PEMFC).

DESCRIPTION OF THE NATIONAL SUPPORT RESEARCH AND DEVELOPMENT

This study was conducted with the support from the Ministry of Trade, Industry and Energy, Republic of Korea under the supervision of the Korea Institute of Energy Technology Evaluation and Planning, the project title is the Development of New and Renewable Energy Core Technology, and the project name is the Development of Ground-Breaking Technology for Non-Platinum Catalyst for Reducing Automotive Fuel Cell Price (2MR3870) (Project Identification No.: 1415142630).

2. Description of the Related Art

The electrode reactions in a PEMFC are generally divided into a fuel electrode reaction in which hydrogen is oxidized and an air electrode reaction in which oxygen is reduced, and water is produced.

When the performance of a catalyst at each electrode is improved, it can be said that studies on the catalyst are very important because the reactivity may be improved. Meanwhile, in the case of a fuel electrode in the fuel cell, the hydrogen oxidation reaction rate is kinetically faster than the oxygen reduction reaction (ORR) in the air electrode by about 5 times or more, so that the development of a poisoning-resistant catalyst capable of preventing the deterioration in activity of a fuel electrode catalyst caused by poisoning of carbon monoxide and sulfur included in modified hydrogen has been studied rather than in a direction to enhance the activity of the catalyst.

In contrast, in the case of the air electrode, the ORR having a low reaction rate most strongly affects deterioration in the overall performance, so that there is a need for developing a highly active catalyst for the ORR. However, since a catalyst, which has been known to have the highest activity in the ORR reaction until now, uses expensive platinum (Pt), an increase in manufacturing costs of a system caused by the use of platinum has become a setback to the commercialization of the catalyst. Accordingly, as an alternative to a catalyst which does not use Pt, Pd catalysts have been studied, but almost no study has been conducted on catalysts using metals other than a palladium (Pd) catalyst.

Accordingly, there is a desperate need for manufacturing a catalyst capable of exhibiting an ORR activity which is equal to or similar to that of an existing platinum catalyst without using platinum or palladium.

REFERENCES OF THE RELATED ART

Patent Documents (Non-Patent Document 1) Yang, Xiaofang, et al. "Role of Surface Iron in Enhanced Activity for the Oxygen Reduction Reaction on a $Pd_3Fe$ (111) Single Crystal Alloy." Angewandte Chemie International Edition 50.43 (2011): 10182-10185.

(Non-Patent Document 2) Liu, Yunqing, and Caixia Xu. "Nanoporous PdTi Alloys as Non Platinum Oxygen Reduction Reaction Electrocatalysts with Enhanced Activity and Durability." ChemSusChem 6.1 (2013): 78-84.

SUMMARY

In an aspect, the present disclosure is directed to providing a catalyst for an oxygen reduction reaction, which is equipped with price competitiveness while having an activity which is equal to or similar to that of an existing platinum catalyst.

In another aspect, the present disclosure is directed to providing a fuel cell using the catalyst.

In an aspect, the present disclosure provides a catalyst for an oxygen reduction reaction, including an alloy in which two metals are mixed, in which the alloy is an alloy of iridium (Ir); and silicon (Si), phosphorus (P), germanium (Ge), or arsenic (As).

In an exemplary embodiment, the catalyst may be represented by the following Chemical Formula 1.

$Ir_xM$          [Chemical Formula 1]

(In Chemical Formula 1, 1<x<3, and M is one or more selected from a group consisting of Si, P, Ge, and As)

In an exemplary embodiment, the alloy may have a face centered cubic (FCC) structure.

In another exemplary embodiment, oxygen may be adsorbed on one or more facets selected from a group consisting of a (100) facet, a (111) facet, and a (110) facet of the alloy.

In another exemplary embodiment, the alloy may be $Ir_2P$.

In another exemplary embodiment, oxygen may be adsorbed on the (111) facet of $Ir_2P$.

In another exemplary embodiment, the alloy may be $Ir_2As$.

In another exemplary embodiment, oxygen may be adsorbed on the (110) facet of $Ir_2As$.

In another aspect, the present disclosure provides a fuel cell including a catalyst for an oxygen reduction reaction, including an alloy in which two metals are mixed, in which the alloy includes an alloy of iridium (Ir); and silicon (Si), phosphorus (P), germanium (Ge), or arsenic (As).

In an exemplary embodiment, the catalyst may be represented by the following Chemical Formula 1.

$Ir_xM$          [Chemical Formula 1]

(In Chemical Formula 1, 1<x<3, and M is one or more selected from a group consisting of Si, P, Ge, and As)

In another exemplary embodiment, the alloy may have a face centered cubic structure.

In another exemplary embodiment, the alloy is $Ir_2P$, and oxygen may be adsorbed on the (111) facet of $Ir_2P$.

In another exemplary embodiment, the alloy is Ir$_2$As, and oxygen may be adsorbed on the (110) facet of Ir$_2$As.

The catalyst for the oxygen reduction reaction according to an aspect of the present disclosure may have excellent price competitiveness while exhibiting a catalytic activity which is equal to or similar to that of an existing platinum catalyst (Pt catalyst). Accordingly, when the catalyst is applied to a fuel cell system, and the like, an amount of Pt catalyst having low price competitiveness may be reduced, so that a production unit cost of a fuel cell system may be lowered.

In addition, the catalyst for the oxygen reduction reaction may have excellent price competitiveness while exhibiting a catalytic activity which is equal to or similar to that of an existing Pt catalyst, and thus may be widely used in various fields such as a fuel cell automobile engine, a battery of a mobile electronic device, and a heat storage system for a building.

DETAILED DESCRIPTION

In the present specification, "(100), (110), or (111)" means a facet cut in a 100, 110, or 111 direction, respectively. Meanwhile, the term "(100), (110), or (111)" may be used interchangeably with a term referring to an alloy material, and Ir$_2$As(110) means a cross-sectional structure cut in a 110 direction of an alloy catalyst Ir$_2$As.

Hereinafter, embodiments of the present disclosure will be described in detail. Embodiments of the present disclosure have been described with reference to accompanying drawings, but have been described for illustration, and the technical spirit of the present disclosure and the configuration and application thereof are not limited thereby.

In an aspect, the present disclosure provides a catalyst for an oxygen reduction reaction, including an alloy in which two metals are mixed, in which the alloy is an alloy of iridium (Ir); and silicon (Si), phosphorus (P), germanium (Ge), or arsenic (As). The catalyst has a price competitiveness while having an activity which is equal to or similar to that of an existing platinum, and thus may be widely used.

Hereinafter, the present disclosure will be examined in detail.

In an exemplary embodiment, the catalyst may be represented by the following Chemical Formula 1.

Ir$_x$M  [Chemical Formula 1]

(In Chemical Formula 1, 1<x<3, and M is one or more selected from a group consisting of Si, P, Ge, and As)

In another exemplary embodiment, in Chemical Formula 1, x may be larger than 1 and smaller than 3. When x is less than 1, the catalytic activity in an oxygen reduction reaction is much lower than that of a Pt catalyst, and when x is more than 3, the catalytic activity is slightly improved, but the level of the catalytic activity may not reach that of the Pt catalyst.

In an aspect, x in Chemical Formula 1 may be larger than 1.5 and smaller than 2.5 (that is, 1.5<x<2), and more specifically, x may be 2.

In an exemplary embodiment, the catalyst may be a single-phase alloy catalyst. In this case, the oxygen reduction reaction may be considerably improved by various synergistic effects (a change in lattice constant, an increase in electron density, and the like).

In another exemplary embodiment, the alloy may have Fm-3m and P42mnm structures, and when the alloy is Ir$_2$P, the structure of Fm-3m may be most preferable in terms of energy.

In another exemplary embodiment, the alloy may be Ir$_2$P, and in this case, the stability of a catalyst including the alloy may be secured, and the catalyst may exhibit excellent catalytic activity.

Meanwhile, Ir$_2$P may have a (100) facet, a (111) facet, and a (110) facet, and among them, oxygen may be most effectively adsorbed on the (111) facet of Ir$_2$P. That is, when oxygen is adsorbed on the (111) facet of Ir$_2$P (hereinafter, Ir$_2$P(111)), the oxygen adsorption energy is formed at the lowest level, so that the catalytic activity in a catalyst for an oxygen reduction, including the Ir$_2$P(111) facet, may be more improved.

In contrast, the alloy may be Ir$_2$As, and in this case, excellent catalytic activity may be exhibited in the oxygen reduction reaction while the stability of the catalyst is secured.

Meanwhile, Ir$_2$As may have a (100) facet, a (111) facet, and a (110) facet, and among them, when oxygen is adsorbed on the (110) facet (hereinafter, Ir$_2$As (110)), the oxygen adsorption energy may be formed at the lowest level, so that oxygen may be most effectively adsorbed. This is judged to be because electrons move from As atoms to Ir atoms on the (110) facet of Ir$_2$As, the affinity of As atoms for oxygen is formed more strongly on the Ir$_2$As(110) facet than the affinity of Ir atoms for oxygen, and as a result, oxygen is adsorbed on As. Accordingly, the total oxygen adsorption energy in a catalyst including the Ir$_2$As(110) facet is decreased, and it is possible to exhibit a catalytic activity in an oxygen reduction reaction, which is at a level that is the same as that of a pure Pt catalyst.

In an exemplary embodiment, the catalyst may have a size of 2 nm to 50 nm. When the size of the catalyst is less than 2 nm, the performance of the catalyst may deteriorate, and when the size is more than 50 nm, the specific surface area of the catalyst is so small that the activity thereof may deteriorate.

In another aspect, the present disclosure provides a fuel cell including a catalyst for an oxygen reduction reaction, including an alloy in which two metals are mixed, in which the alloy includes an alloy of iridium (Ir); and silicon (Si), phosphorus (P), germanium (Ge), or arsenic (As). Meanwhile, the catalyst, which the fuel cell includes, includes a configuration which is the same as or similar to that of the above-described catalyst for the oxygen reduction reaction, and accordingly, the detailed description on the catalyst will be omitted.

In an exemplary embodiment, the catalyst may be represented by the following Chemical Formula 1.

$Ir_xM$ [Chemical Formula 1]

(In Chemical Formula 1, 1<x<3, and M is one or more selected from a group consisting of Si, P, Ge, and As)

Further, the alloy is $Ir_2P$, and oxygen may be adsorbed on the (111) facet of $Ir_2P$.

In contrast, the alloy is $Ir_2As$, oxygen may be adsorbed on the (110) facet of $Ir_2$, and in this case, the catalytic activity in a catalyst including the alloy may be improved to a level which is equal to that of a Pt catalyst. As a result, the performance of a fuel cell including the same may be significantly improved.

EXAMPLES

Hereinafter, the present disclosure will be described in detail through an example and test examples. However, the following example and test examples are for illustrative purposes only and it will be apparent to those of ordinary skill in the art that the scope of the present disclosure is not limited by them.

Experimental Examples

Figure 1:
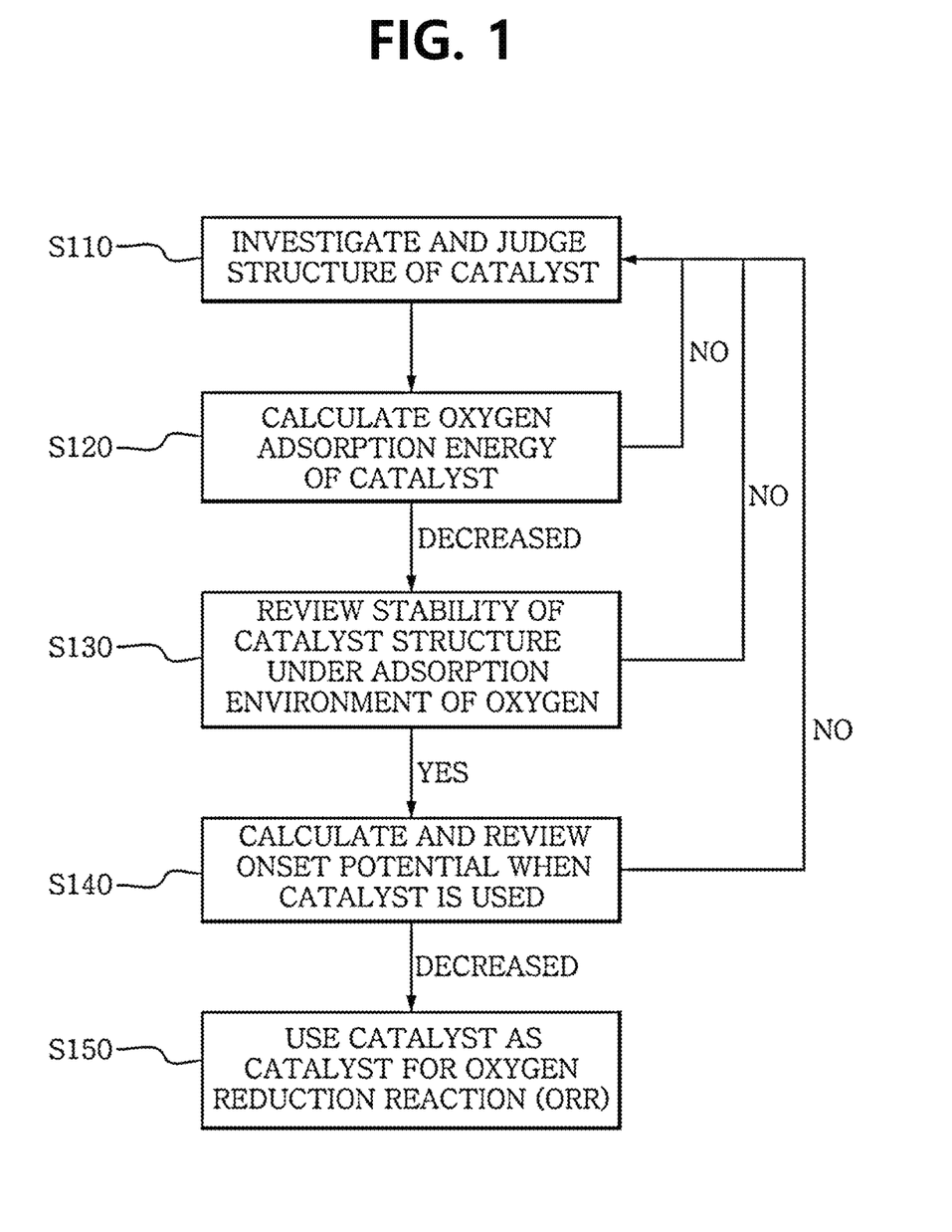
FIG. 1 is a flowchart showing a process of manufacturing a catalyst for an oxygen reduction reaction according to an aspect of the present disclosure.

In order to prepare a catalyst having an optimal effect of a catalyst for an oxygen reduction reaction, a catalyst was prepared by the method described in FIG. 1.

First, a material capable of being used as a catalyst was investigated, and the structure thereof was reviewed (S110). Specifically, as a metal equipped with higher price competitiveness than platinum (Pt), iridium (Ir) having a reduction potential close to that of platinum was selected. However, since pure Ir has a higher oxygen affinity than Pt, and thus has low activity with respect to an oxygen reduction reaction, an alloy catalyst based on Ir (hereinafter, an $Ir_xM$ catalyst) was decided to be used in order to control the oxygen affinity, and at this time, an alloy formation energy with respect to the $Ir_xM$ structure was calculated by the following Equation 1 because it needed to be investigated what metal material and Ir could form an alloy.

$$E_{formation}=E_{bulk}-(N_{ir}*(E_{Ir\_atom})+N_m*(E_{M\_atom}))$$ [Equation 1]

(In Equation 1, $E_{formation}$ denotes a formation energy of an alloy, $E_{bulk}$ denotes an alloy formation energy of an alloy, $N_{ir}$ denotes the number of Ir atoms, $E_{Ir\_atom}$ denotes an energy of Ir atoms, $N_m$ denotes the number of M atoms, and $E_{M\_atom}$ denotes an energy of M atoms.)

Figure 2:
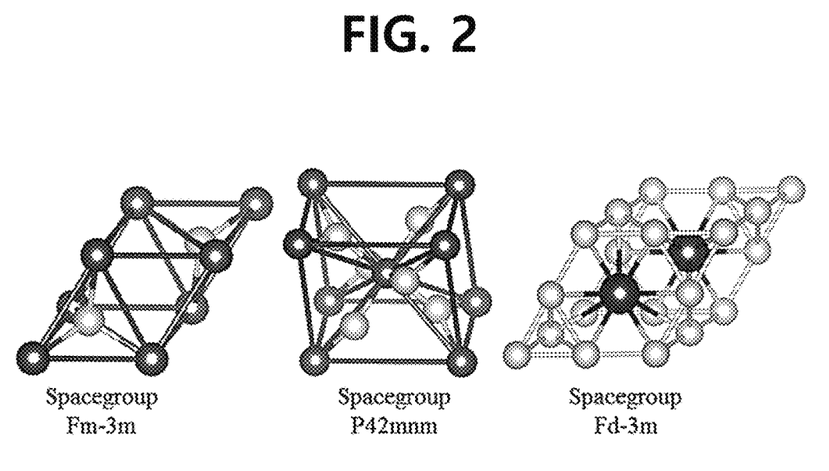
FIG. 2 shows bulk structures, that is, Fm-3m, P42mnm, and Fd-3m structures of an alloy which the catalyst for the oxygen reduction reaction according to an aspect of the present disclosure includes.

Meanwhile, the $Ir_xM$ catalyst has a face centered cubic (FCC) structure having different space groups, and may have, for example, a face centered cubic structure having a Fm-3m space group, a P42mnm space group, and a Fd-3m space group as shown in FIG. 2. Among them, when the $Ir_xM$ catalyst has a face centered cubic structure having a Fm-3m space group, the $Ir_xM$ catalyst is preferable in terms of energy.

That is, the formation energy of the $Ir_xM$ catalyst needs to be smaller than 0 eV, and when a calculation was made through Equation 1, it was possible to derive that the case where M is one or more selected from a group consisting of Al, Si, P, Ge, As, Mg, Ca, Sr, Ba, La, and Ce is preferable.

Thereafter, a more preferred alloy was selected as an alloy for a catalyst for an oxygen reduction reaction by calculating an oxygen adsorption energy on the surface (or the facet) of a FCC structure, which the $Ir_xM$ catalyst has, based on the metals (S120).

That is, since the catalytic activity changes according to the facet of the $Ir_xM$ catalyst, the oxygen adsorption energy on a facet having a low index plane, such as the (100) facet, (111) facet, and (110) facet of the $Ir_xM$ catalyst, was calculated.

Among them, first, the oxygen adsorption energy on the (100) facet of the $Ir_xM$ catalyst was calculated. Specifically, in an $Ir_xM$ catalyst such as $Ir_2Al$, $Ir_2Si$, $Ir_2P$, $Ir_2Ge$, $Ir_2As$, and $Ir_2Mg$, the oxygen adsorption energy in a catalyst having the (100) facet (that is, a catalyst having the $Ir_2Al$ (100), $Ir_2Si$(100), $Ir_2P$(100), $Ir_2Ge$(100), or $Ir_2As$(100) facet) was calculated. At this time, as a comparative example, the oxygen adsorption energy in a catalyst having a (111) facet of pure Ir having a FCC crystal structure was calculated.

Hereinafter, in a catalyst having the $Ir_2Al$(100), $Ir_2Si$(100), $Ir_2P$(100), $Ir_2Ge$(100), or $Ir_2As$(100) facet, the results of the oxygen adsorption energy (eV) are shown in the following Table 1.

TABLE 1

| Oxygen adsorption energy (Eo, eV) | | | | | |
| --- | --- | --- | --- | --- | --- |
| $Ir_2Al$ | Ir | $Ir_2Si$ | $Ir_2P$ | $Ir_2Ge$ | $Ir_2As$ |
| −6.30 | −5.35 | −5.31 | −4.96 | −5.25 | −4.72 |

As shown in Table 1, it was confirmed that in the catalysts having the (100) facet of $Ir_2Si$, $Ir_2P$, $Ir_2Ge$, and $Ir_2As$ alloys, the oxygen adsorption energy had a value smaller than the oxygen adsorption energy in a catalyst having a pure Ir(111) facet, and accordingly, these alloys had excellent catalytic activity, and thus could be used as a catalyst for an oxygen reduction reaction.

Thereafter, the stability of the catalyst was calculated under vacuum conditions and under conditions in which oxygen was adsorbed, and as a result, an adsorbate was formed (S130).

This is because a catalyst is not easily used if the stability of the catalyst is not secured even though the catalyst has activity. In particular, even though the catalyst structure is stable in a vacuum state, segregation may often occur on the surface thereof under conditions in which oxygen is adsorbed, and as a result an adsorbate is formed, so that it is important to secure stability even when oxygen is adsorbed on the surface of the catalyst, and as a result, the adsorbate is formed. At this time, in the case of $E_{segregation}$<0 eV, that is, when $E_{segregation}$ recorded a negative number lower than 0, it was judged that the catalyst structure secures stability.

As a result of calculation of $E_{segregation}$, it could be confirmed that all the catalysts having $Ir_2Si$(100), $Ir_2P$(100), $Ir_2Ge$(100), and $Ir_2As$(100) facets secured stability under vacuum conditions and under conditions in which oxygen was adsorbed, and as a result, an adsorbate was formed.

Subsequently, a free energy (ΔG) with respect to the ORR activity was calculated when a catalyst including the alloy was used, and a potential in which ΔG≤0, that is, an onset potential was measured and reviewed (S140). This is because the higher the onset potential value is, the more advantageous the catalyst is.

Figure 3:
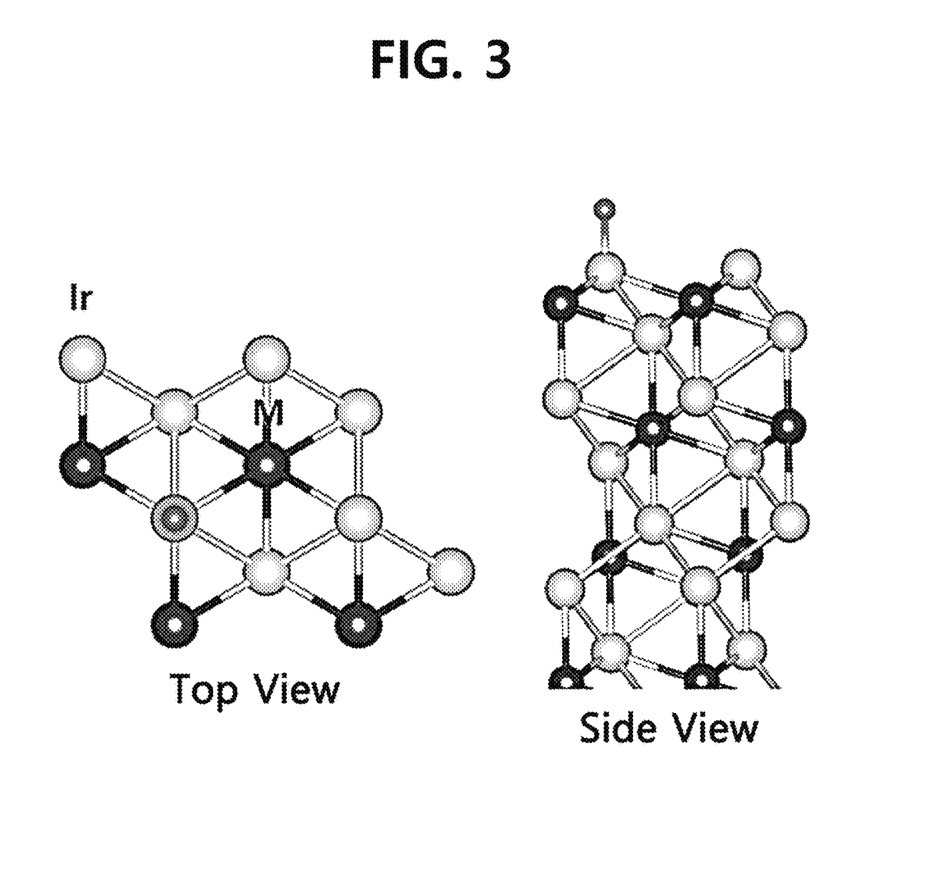
FIG. 3 shows a structure in which oxygen is adsorbed on a (100) facet of the catalyst for the oxygen reduction reaction according to an aspect of the present disclosure.
Figure 4:
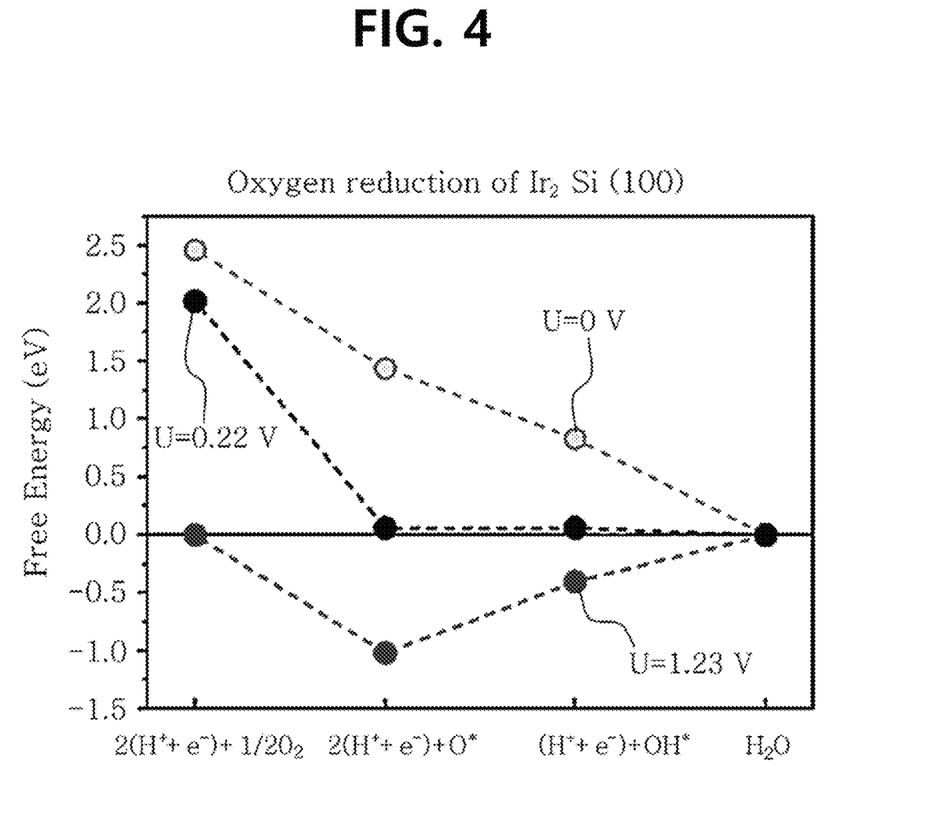
FIG. 4 is a graph showing a free energy with respect to the over potential or onset potential in an oxygen reduction reaction using a catalyst which has an Ir$_2$Si(100) facet.

As a result of calculation through Equation 2, it was judged that the onset potentials in the catalysts having $Ir_2P(100)$, $Ir_2Ge(100)$, and $Ir_2As(100)$ facets exhibited much smaller values than a catalyst having a Pt(100) facet (0.70 V) or a catalyst having a Pd(100) facet (0.32 V), and accordingly, the catalyst was inappropriate to be used as a catalyst for an oxygen reduction reaction. Further, it could be confirmed that the onset potential in the catalyst having the $Ir_2Si(100)$ facet exhibited the highest value in the alloy catalyst (the structure is shown in FIG. 3), but exhibited a much smaller onset potential value than a catalyst having a Pt(100) facet or a catalyst having a Pd(100) facet (FIG. 4).

Accordingly, going back to S120 step, the oxygen adsorption energy on the facet having another low index in the $Ir_xM$ catalyst was calculated.

Figure 5:
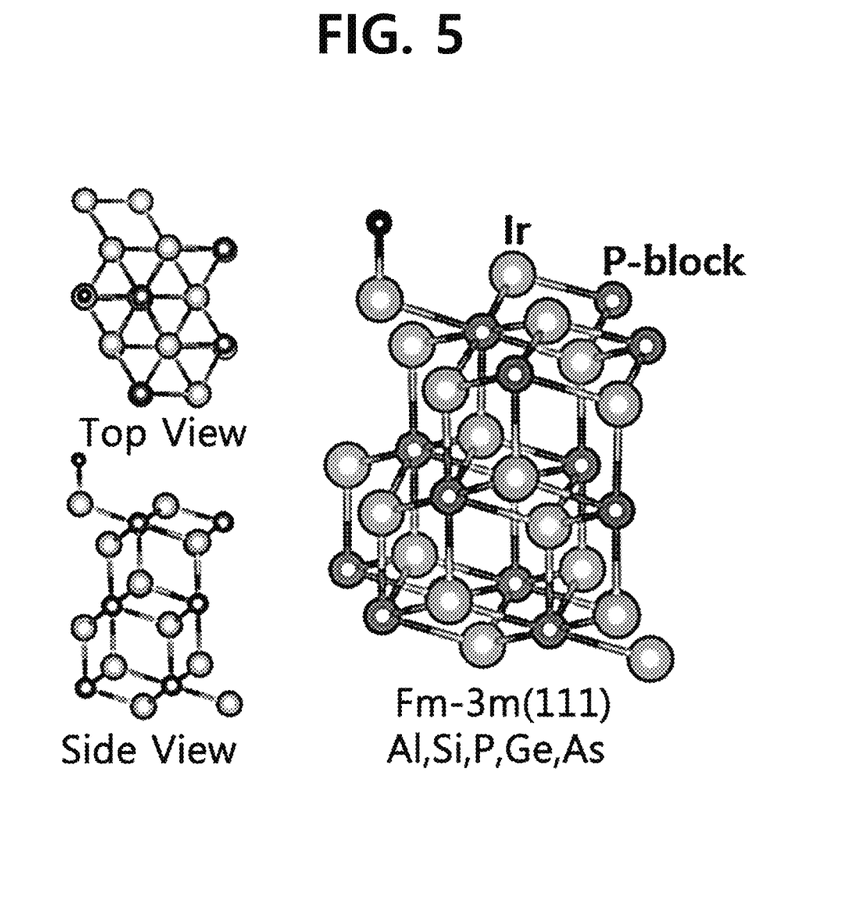
FIG. 5 shows a structure in which oxygen is adsorbed on a (111) facet of the catalyst for the oxygen reduction reaction according to an aspect of the present disclosure.
Figure 6:
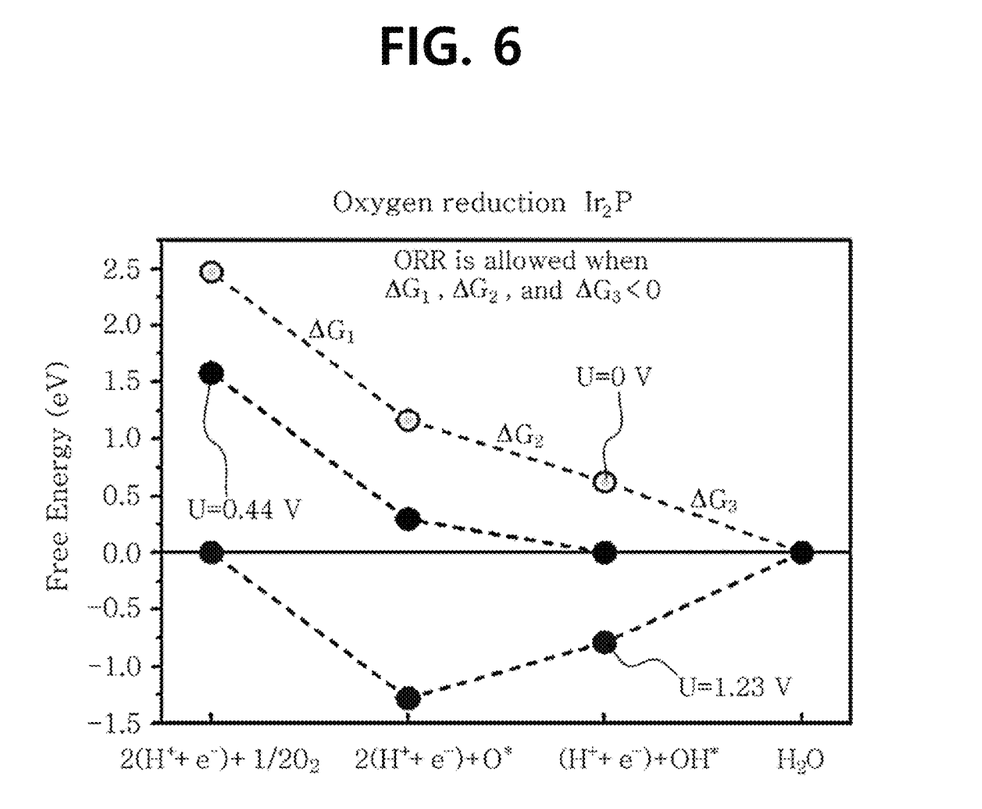
FIG. 6 is a graph showing a free energy with respect to the over potential or onset potential in an oxygen reduction reaction using a catalyst which has an Ir$_2$P(111) facet.

That is, the oxygen adsorption energy values in the catalyst having the $Ir_xM$ (111) facet were calculated at this time, and among them, the oxygen adsorption energy values of the catalysts such as catalysts having $Ir_2P(111)$, $Ir_2Ge$ (111), and $Ir_2As(111)$ facets were smaller than that of a catalyst having a pure Ir(111) facet (FIG. 5), and as a result of reviewing stability as in S130 step, it was judged that the stability was excellent and preferable under vacuum conditions and under conditions in which oxygen was adsorbed, and as a result, an adsorbate was formed. However, as a result of calculating a free energy with respect to the ORR activity thereof, it could be confirmed that the onset potential of the catalyst having the $Ir_2P(111)$ facet exhibited a value of 0.44 V, and thus was improved as compared to 0.16 V which is an onset potential value of the catalyst having the pure Ir(111) facet and the onset potential value of the catalyst having the Pd(111) facet (FIG. 6).

Figure 7:
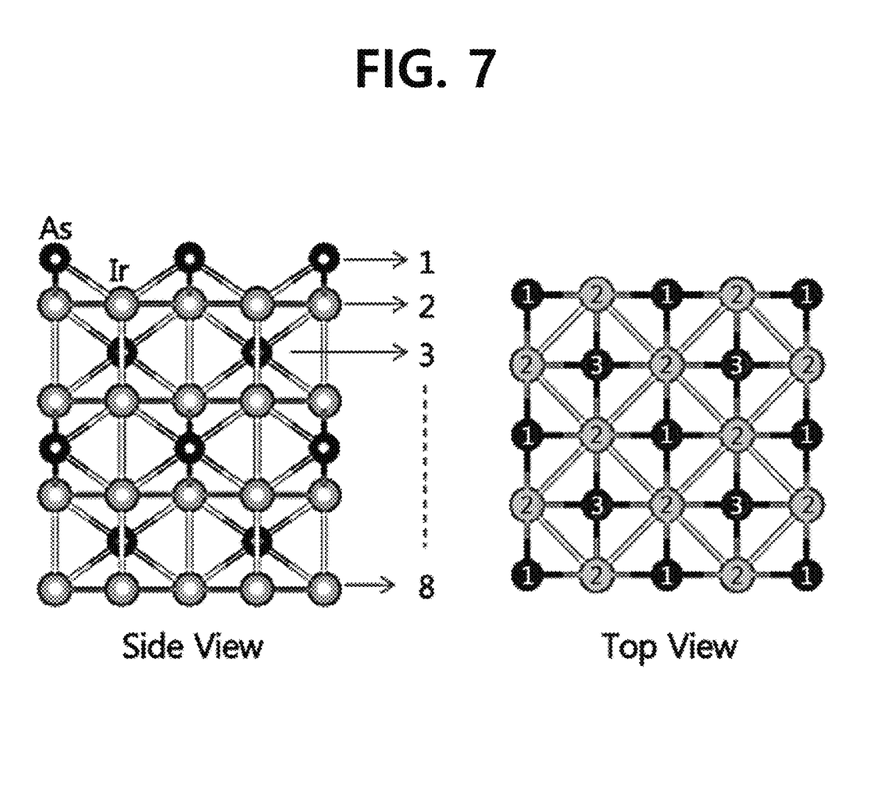
FIG. 7 shows a structure in which oxygen is adsorbed on a (110) facet of the catalyst for the oxygen reduction reaction according to an aspect of the present disclosure.
Figure 8:
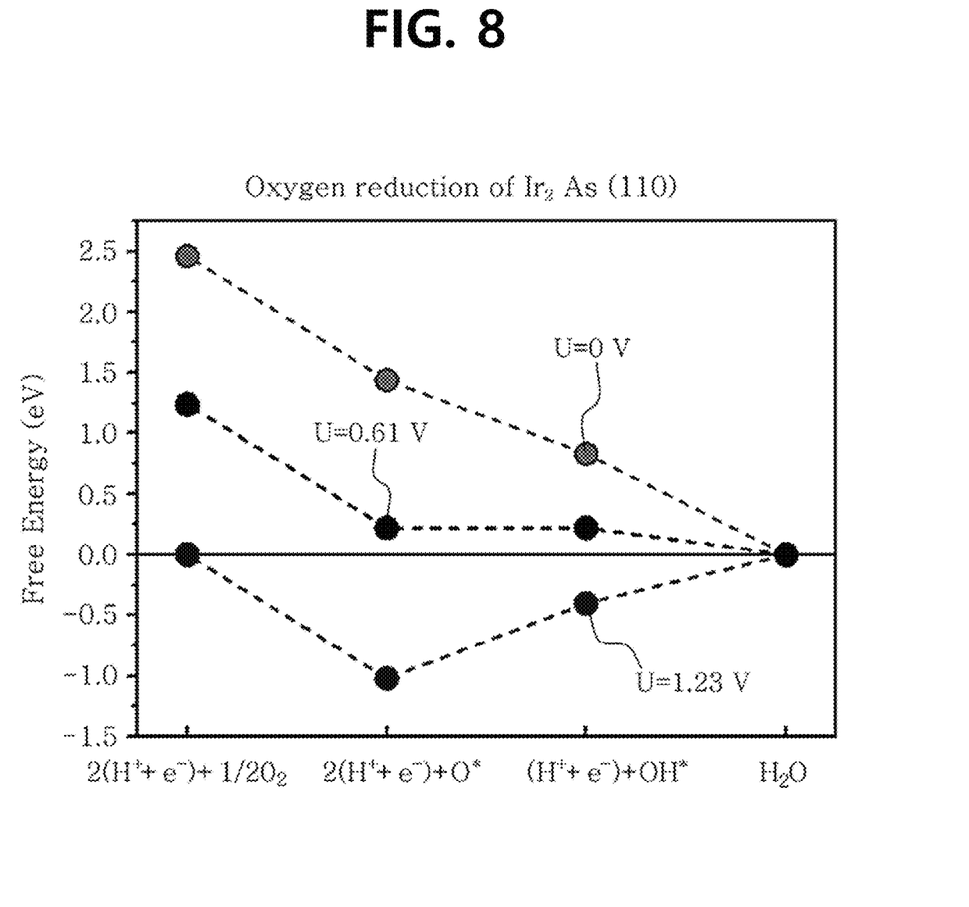
FIG. 8 is a graph showing a free energy with respect to the over potential or onset potential in an oxygen reduction reaction using a catalyst which has an Ir$_2$As(110) facet.

Meanwhile, in order to review a catalyst having a more improved catalytic activity, each going back to S120 step, the oxygen adsorption energy values in the catalyst having the $Ir_xM$ (110) facet were calculated, and it was judged that among them, the oxygen adsorption energy values of the catalysts having $Ir_2Ge(110)$ and $Ir_2As(110)$ facets were smaller than that of the catalyst having the pure Ir(111) facet (FIG. 7), and stability was excellent and preferred under vacuum conditions and under conditions in which oxygen was adsorbed, and as a result, an adsorbate was formed. Further, since the energy for removing As atoms was predicted to cause a stronger endothermic reaction than the energy for removing Ir, it was judged that the stability of the $Ir_2As$ structure was excellent. Subsequently, as a result of calculating a free energy with respect to the ORR activity thereof, it could be confirmed that the onset potential of the catalyst having the $Ir_2As(110)$ facet exhibited a value of 0.61 V, and thus was excellent as compared to other alloy catalysts and was close to the level of the pure Pt (FIG. 8).

Figure 9:
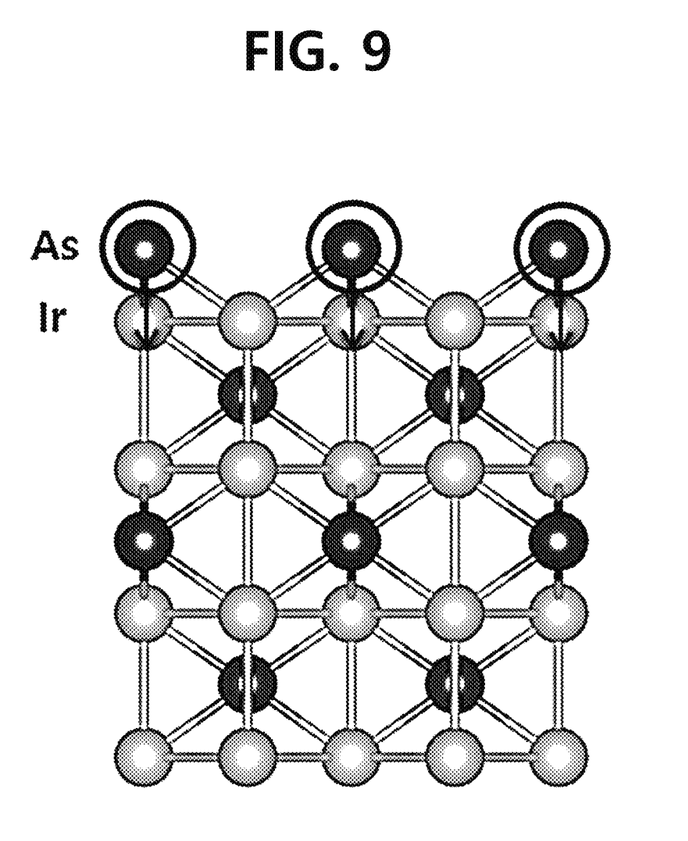
FIG. 9 shows an electron moving direction of Ir and As in a catalyst which has an Ir$_2$As(110) facet.
Figure 10:
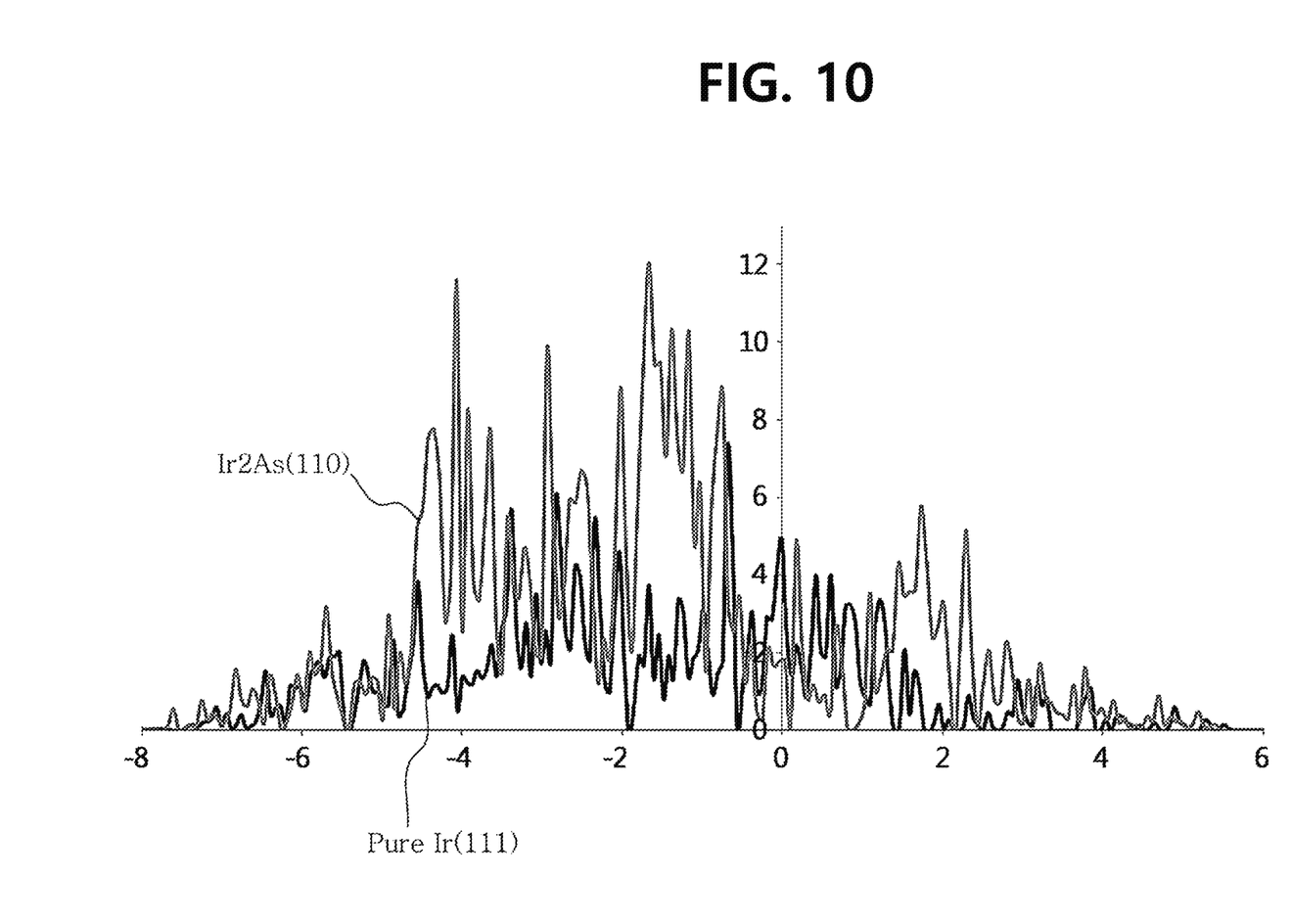
FIG. 10 shows an electronic structure of the d-orbital in a catalyst which has an Ir$_2$As(110) facet.

Accordingly, it could be confirmed that the oxygen adsorption energy in the catalyst having the $Ir_2As(110)$ facet was the lowest, and as a result, the catalytic activity was most significantly improved. As electrons move from As atoms to Ir atoms in the catalyst having the $Ir_2As(110)$ facet, the electronic structure of the surface is changed, so that the oxygen adsorption energy of the catalyst having the $Ir_2As$ (110) facet appears to be reduced (FIGS. 9 and 10), and in this case, it is judged that in the catalyst having the $Ir_2As$ (110) facet, the oxygen affinity in As atoms becomes stronger than that in Ir atoms, and as a result, oxygen is adsorbed on As atoms and the oxygen energy is decreased. Accordingly, it is judged that when the catalyst having the $Ir_2As$ (110) facet is used in a catalyst for an oxygen reduction reaction, the best catalytic activity may be exhibited.

The Examples of the present disclosure previously described should not be interpreted to limit the technical spirit of the present disclosure. The scope of the present disclosure to be protected is limited only by the matters described in the claims, and those skilled in the art of the present disclosure can improve and change the technical spirit of the present disclosure in various forms. Therefore, such improvements and changes would fall within the scope of the present disclosure to be protected as long as they are obvious to those skilled in the art.

What is claimed is:

1. A catalyst for an oxygen reduction reaction, comprising an alloy in which two metals are mixed,
   wherein the alloy is an alloy of iridium (Ir); and silicon (Si), phosphorus (P), germanium (Ge), or arsenic (As);
   wherein the alloy is $Ir_2P$ and has a face-centered cubic (FCC) structure.

2. The catalyst according to claim 1, wherein oxygen is adsorbed on one or more facets selected from a group consisting of a (100) facet, a (111) facet, and a (110) facet of the alloy.

3. The catalyst according to claim 1, wherein oxygen is adsorbed on the (111) facet of $Ir_2P$.

4. The catalyst according to claim 1, wherein the alloy is $Ir_2As$.

5. The catalyst according to claim 4, wherein oxygen is adsorbed on the (110) facet of $Ir_2As$.

6. A fuel cell comprising a catalyst for an oxygen reduction reaction, comprising an alloy in which two metals are mixed,
   wherein the alloy comprises an alloy of iridium (Ir); and silicon (Si), phosphorus (P), germanium (Ge), or arsenic (As); wherein the alloy is $Ir_2P$ and has a face-centered cubic (FCC) structure.

7. The fuel cell according to claim 6, wherein the alloy is $Ir_2As$, and oxygen is adsorbed on the (110) facet of $Ir_2As$.

* * * * *